Dec. 23, 1958 L. W. PARTRIDGE 2,865,366
ELECTROCARDIOGRAPH
Filed July 23, 1954 5 Sheets-Sheet 1

Fig. 1.

Inventor
Leslie W. Partridge
By Mason, Kolehmainen, Rathburn & Wyss
Attorneys

Dec. 23, 1958 L. W. PARTRIDGE 2,865,366
ELECTROCARDIOGRAPH
Filed July 23, 1954 5 Sheets-Sheet 3

Inventor
Leslie W. Partridge
By Mason, Kolehmainen, Rathburn & Wyss
Attorneys Dec. 23, 1958     L. W. PARTRIDGE     2,865,366
ELECTROCARDIOGRAPH
Filed July 23, 1954     5 Sheets-Sheet 4

United States Patent Office 2,865,366
Patented Dec. 23, 1958

2,865,366

ELECTROCARDIOGRAPH

Leslie W. Partridge, Janesville, Wis., assignor to The Burdick Corporation, Milton, Wis., a corporation of Delaware Application July 23, 1954, Serial No. 445,235

23 Claims. (Cl. 128—2.06)

The present invention relates to electrocardiographs and has for its primary object the provision of a new and improved electrocardiograph.

Electrocardiographs are used for observing or recording small variations in voltage between various parts of the human body created by heart action. These voltage variations are exceedingly small and sensitive detection and high powered amplifying apparatus is customarily used in observing or recording them. The apparatus generally includes lead selector switch means for selectively connecting various of the patient electrodes, which are connected to different parts of a patient's body, to the input of the amplifier through patient leads. As customarily used, electrodes are connected to the right arm, left arm, left leg, right leg and to various parts of the chest. In one series of connections, certain of the electrodes are connected to the amplifier input through associated leads. In another series of connections, the so-called augmented connections, two of the electrodes are connected to each other and these interconnected electrodes are connected to one terminal of the amplifier input, the other terminal of the amplifier being connected to a single electrode. Another series of connections, the V-connections, include three electrodes interconnected and connected to one of the amplifier input terminals while the other amplifier input terminal is connected to a chest electrode. A further series of connections include the chest electrode and selected ones of the arm and leg electrodes connected to the amplifier input.

With known types of electrocardiographs, it has been observed that undesirable transients interfering with the obtaining of good records occur when the electrode connections are changed. In certain types of equipment, it is necessary to wait for a relatively long interval after a change in patient electrodes or leads in order to avoid obtaining records including the interfering transients and it has not been possible to make successive records of all the various combinations of patient electrodes without any substantial time delay between a record obtained from one set of electrodes and that obtained from another set of electrodes.

It is one of the primary objects of the present invention to provide a fast acting electrocardiograph in which records from the various sets of electrodes may be obtained without any substantial delay when the amplifier input connections are switched from one set of leads or electrodes to another.

A further object of the present invention is to provide a new and improved electrocardiograph which is so fast acting that a change in patient electrode connections to the amplifier input can be made without any appreciable delay and, in fact, so fast that not even one heart beat is missed.

A fast acting electrocardiograph of the character resulting from the present invention is particularly important for obtaining records of an exercise test. In making this test, the patient exercises for a short period and immediately thereafter the electrocardiograph is used to obtain an electrocardiogram of the patient's heart action. In this test it is desirable to obtain an electrocardiogram with the many possible electrode connections of which they may be, and usually are, ten. In order to obtain the best possible data, the record should not miss any of the heart action. The apparatus of the present invention enables this to be done. It also enables the apparatus to be used with a substantial savings in time and paper.

There are a number of factors which contribute toward the production of the transients as a result of the lead or electrode switching operation. One of the transients results from variations in charging of coupling condensers located between a preamplifier stage and a following direct coupled amplifier. These variatons in charges result from the fact that each electrode on the patient develops a different "skin potential" and thus for each lead selection a different quiescent input voltage is applied to the preamplifier. Thus, for each lead selection the coupling condenser generally operates with a different charge. After lead switching, a change in condenser charge can take place only by current flow through the effective generator impedance of the preamplifier tube. The length of the time required for the condensers to charge to new voltages is proportional to the impedance in series with them.

In accordance with one of the features of the present invention, the electrocardiograph of the present invention is constructed to employ a cathode follower circuit for driving the coupling condensers and these condensers are short circuited by a double switch arrangement which short circuits the condensers and then connects them to ground. The arrangement is such that the charges on the condensers will be brought to proper voltages rapidly irrespective of whether the voltages are equal and opposite or not. In other words, the arrangement is such that the charging of the condensers in response to both the equal and opposite voltage differences (the out of phase voltages) and the variations of the two voltages from the original average (the in-phase voltage variations) is accomplished rapidly.

An electrocardiograph constructed with the cathode follower type of coupling condenser driver and short circuiting and grounding switch has a charging time constant of the condensers of only about .01 second. As a result, the short circuit across the condensers (which is effectively a short circuit across the input of the first D. C. amplifier) can be removed to make a record immediately or as fast as humanly possible after lead switching without the transient noted with previous types of equipment. No transients were recorded when this fast switching was employed on those patient electrodes of which but two were connected, one to each input terminal of the amplifier. However, a new transient in the form of a double exponential transient was noted on the so-called augmented and V-connections in which two or more of the electrodes are interconnected and connected by one lead to one of the amplifier input terminals, the other of which is connected by another lead to a single patient electrode. When two or more of the electrodes are interconnected for connection to one of the input terminals, there is effectively produced a network of resistors, condensers and bias cells resulting in a flow of current through the interconnected electrodes, the salty electrocardiograph paste, if used, and the body of the patient which produces the voltage transients when the lead selector switch is changed to or from or between various of the augmented and V-leads. According to another feature of the present invention, these undesirable transients are effectively eliminated by substantially reducing the current flow in the circuit including the patient and interconnected patient electrodes. For example, a resistance of about 100,000 ohms placed in circuit between each electrode and the point of interconnection thereof reduces the maximum amplitude of the transient to an inconsequential maximum value of one or two millimeters on a standard record.

It is accordingly a further object of the present invention to provide a new and improved electrocardiograph wherein transients resulting from current and voltage variations occurring upon the interconnection of electrodes is effectively eliminated. This elimination combined with the substantial elimination of transients because of variations in charge in the coupling condensers enables the electrocardiograph of the present invention to be extremely fast acting.

A further object of the present invention is the provision of a new and improved electrocardiograph in which the short circuiting and grounding of the coupling condensers is accomplished in a simple and effective manner by means operated simultaneously with the lead selector switch.

Other objects and advantages of the present invention will become apparent from the ensuing description of illustrative embodiments thereof, in the course of which reference is had to the accompanying drawings, in which:

Fig. 17 is a diagrammatic representation of a portion of a further embodiment of the invention.

Figure 1:
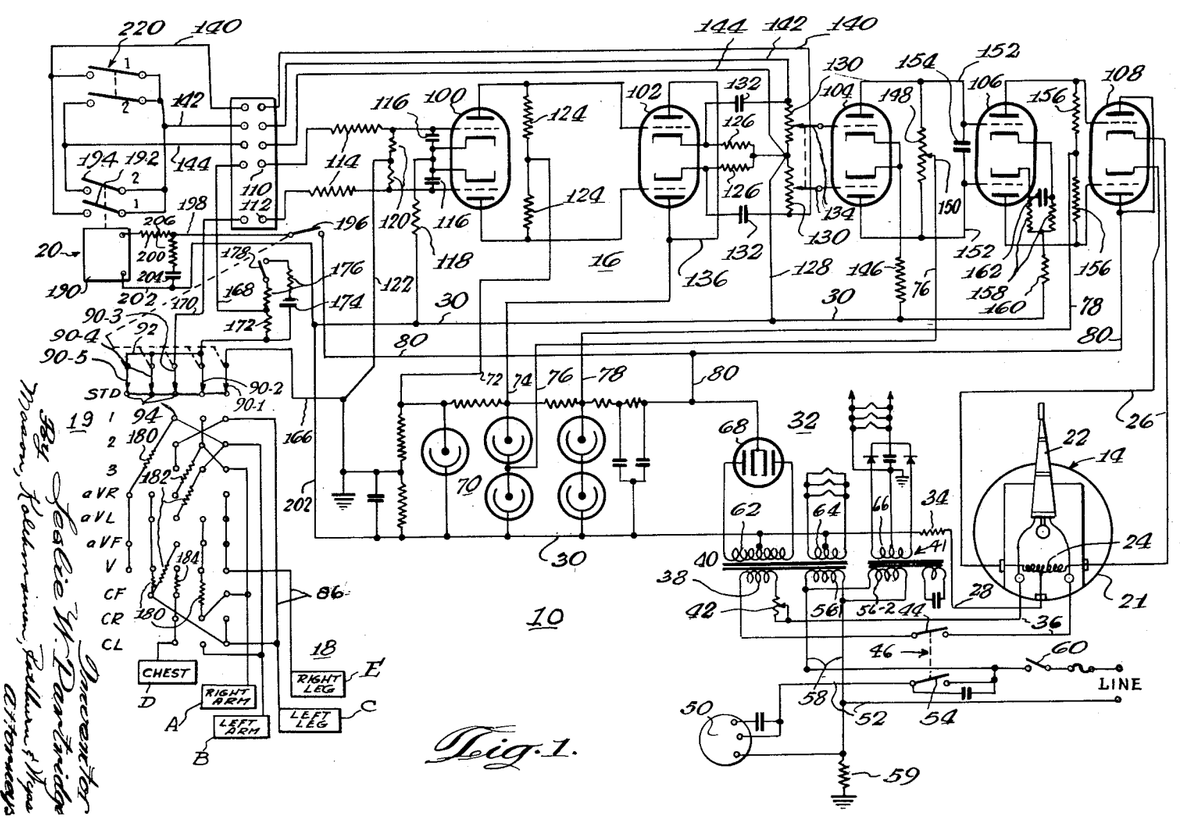
Fig. 1 is a diagrammatic representation of one embodiment of the invention.

Referring now to Fig. 1, the electrocardiograph 10 illustrated diagrammatically therein includes, in the main, indicating and recording apparatus 14, a multi-stage amplifier 16, a set of patient electrodes 18, a patient lead selector switch 19 for selectively connecting various of the patient electrodes and thus various parts of the patient's body to the input of the amplifier through patient leads, and a relay operated switch 20 controlled by the patient selector switch 19 and controlling the amplifier in a manner hereinafter to be described in greater detail.

The indicating and recording apparatus 14 may be of known construction. It includes a galvanometer 21 having a stylus 22 for recording the amplified heart potentials. The galvanometer is illustrated as being of the moving coil type, having its coil 24 connected by the conductors 26 to the output of amplifier 16 in a manner to be described shortly. The midpoint of the coil 24 is connected by conductor 28 to the B— conductor 30 of the power supply, which is indicated generally by the reference character 32, through a series resistor 34. The stylus is supplied with heating current through conductors 36 from the secondary winding 38 of a power transformer 40 at a rate determined by the adjustment of a variable resistor 42 whenever switch blade 44 of a motor switch 46 is closed. The stylus is adapted to make a record of the amplified heart potentials upon a suitable sensitized tape, not shown, which may be driven by a tape drive motor 50 adapted to be energized when the motor switch 46 is closed. The energizing circuit for the motor includes the conductors 52 and a second switch blade 54 of the motor switch 46.

The transformer 40 is energized by the primary winding 56–1 supplied through conductors 58 when a main power switch 60 is closed. The transformer 40 is a conventional power transformer including the secondary windings 62, 64 and 38 supplying the rectifier, the cathode heaters of the various tubes and the stylus. A second transformer 41 of the constant voltage type having a primary winding 56–2, in parallel with winding 56–1, and a secondary winding 66 is used to supply the cathode heaters of certain tubes. The power supply 32 includes a rectifier tube 68 supplying a voltage regulator section indicated as a whole by reference character 70 and various B+ conductors 72, 74, 76, 78 and 80.

Figures 2, 3:
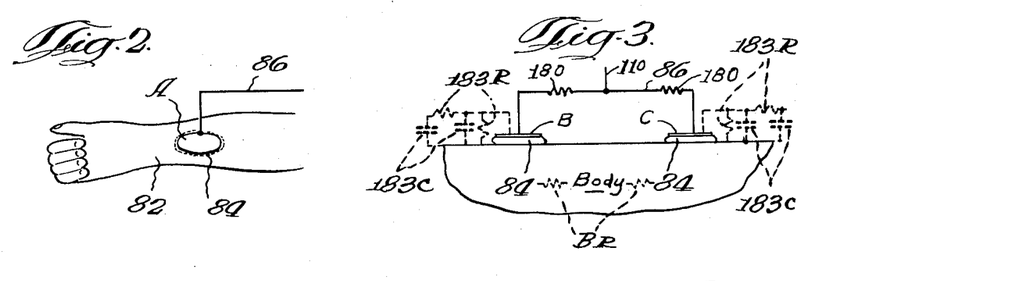
Fig. 2 is a diagrammatic showing of a single patient electrode applied to the arm of a patient.
Fig. 3 is a diagrammatic illustration used in describing certain features of the invention.

The patient electrodes 18 may be of conventional construction and may be connected to the remainder of the apparatus through a plug and socket type of receptacle, not shown. As illustrated, there are five electrodes. These are the right arm electrode A, a left arm electrode B, a left leg electrode C, a chest electrode D and a right leg electrode E. One of the electrodes A is illustrated in Fig. 2 where it is shown connected to the arm 82 of a patient through the use of the usual electrocardiograph electrode paste 84 which is salty in nature to provide a good electrical contact between the metallic electrode and the skin of the patient. The electrodes are connected by the usual well insulated and shielded conductors 86 to the patient electrode selector switch 19.

Figure 9:
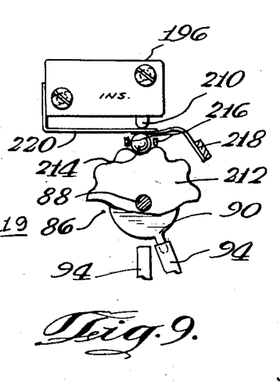
Fig. 9 is a fragmentary diagrammatic representation of the patient lead selector and coupling condenser control switch.

The patient lead selector switch 19 is illustrated diagrammatically in Fig. 1 and fragmentarily and schematically in Fig. 9. It is preferably of the rotary type and movable into a series of eleven positions as indicated in Fig. 1. The switch, referring now to Fig. 9, includes a plurality of movable contact carrying wafers 86 (only one of which is shown) mounted on a shaft 88 adapted to be rotated by a suitable knob, not shown. Each of the movable wafers carries a contact 90, also shown diagrammatically in Fig. 1, and three of which are interconnected by the conductor 92 as shown in Fig. 1. The movable contacts have associated with them a series of stationary contacts 94 connected as shown in Fig. 1 and located as shown diagrammatically in this figure. The various connections of the lead selector switch and other functions performed by it will be described after a description of the amplifier 16.

The amplifier 16 is of the multi-stage type and in accordance with one of the features of the present invention, it is constructed of a plurality of dual triodes 100, 102, 104, 106 and 108 of which all but tube 108 are of the same type which may be the 12AX7 type. Type 108 constitutes a power amplifier stage and it may be of the 6BL7–GT type.

The amplifier includes a pair of input terminals 110 and 112 connected to the grids of tube 100 through resistors 114, which together with the by-pass condensers 116 constitute a radio frequency filter. The resistors may have a value of about 10,000 ohms and capacitors a value of about .001 microfarad. The cathodes are joined together and connected to the B— conductor 30 through a common bias resistor 118 having a value of about 680,000 ohms, which makes the amplifier act as a differential amplifier. In order to avoid floating grids, the input of the amplifier is also shunted by the resistors 120, each having a value of about 10 megohms, the junction of which is connected to ground through conductor 122. The tube 100 is thus connected as a push pull amplifier and it is used as a preamplifier.

The preamplifier tube 100 is coupled directly to the tube 102, which is used as a coupling condenser charger, the plates of tube 100 being connected to the grids of tube 102. The plates are also connected by the load resistors 124 having a value of about 1 megohm and the junction of which is connected to the source of plate potential, i. e., conductor 72.

In accordance with one of the features of the present invention, the tube 102 is connected as a push pull cathode follower to provide a low impedance driving arrangement which may be considered to be a condenser charging stage, it providing no amplification. The cathodes of tube 102, which is a dual triode, are connected to −B through their respective cathode resistors 126 and conductor 128. The conductor 128 also connects to −B, the junction of the resistors 130, each having a value of 5 megohms and each having a terminal connected to a cathode of tube 102 through a coupling condenser 132. The resistors 130 are connected by the simultaneously movable or adjustable contacts 134 to the grids of tube 104. The movable contacts 134 are simultaneously movable in opposite directions to provide a means for controlling the gain of the amplifier. The plates of tube 102 are interconnected by conductor 136 which is connected to the plate voltage supply conductor 74.

In accordance with a further feature of the present invention, the charging time of the capacitors 132 is further decreased by short circuiting the resistors 130 and connecting the junction thereof to ground. The short circuiting and connecting to ground is effected through the conductors 140 and 142 and the conductor 144 respectively. These are connected to the relay operated switch 20 in a manner to be described hereinafter after completion of the description of the amplifier. Simultaneously with the shorting of resistors 130, the input to amplifier tube 104 is short circuited. This is accomplished by the same means that short circuits the resistors 130.

The tube 104 is utilized as a first D. C. amplifier. It is, as already described, supplied with the signal voltage through the resistors 130. Its cathodes are interconnected and connected to ground through the bias resistor 146. Its plates are connected across a load resistor 148 which may have a value of about 5 megohms and which is connected by the adjustable contact 150 to the plate voltage supply conductor 76, the adjustable connection providing a positioning or centering control whereby the stylus 22 can be readily centered or otherwise positioned. The opposite terminals of the resistor 148 are connected by conductors 152 to the grids of tube 106 constituting a second D. C. amplifier.

In order to attenuate thermal noise voltages originating in the preamplifier, the grids of tube 106 are shunted by a condenser 154 having a value of about 500 micromicrofarads. Its value is chosen to be as large as possible without materially affecting the operation of a frequency compensating circuit associated with tube 106 and which will now be described.

The second D. C. amplifier 106 has its plates connected to the plate resistors 156, the junction of which is connected to the plate voltage supply conductor 78. The cathodes are connected together through the cathode resistors 158, each having a value of about 39,000 ohms, the junction of which is connected to the B− conductor 30 through series resistor 160 having a value of about 390,000 ohms. The resistors 158 cause degeneration in the two sections of tube 106 whereby they decrease the gain of the triodes a specified amount for all frequencies. In order to provide compensation for the frequency response of the galvanometer, the cathodes are shunted by a condenser 162, having a value of about .047 microfarad which causes the degeneration effect to decrease as the frequency of the amplified signal voltage increases. This results in an increase of the amplifier gain as the frequency increases. The values of the resistances in the cathode circuits of the tube 106 and the time constant of the RC circuit including the resistors 158 and condenser 162 can be selected to provide the proper compensation for the particular galvanometer that is used.

The last tube of the amplifier, i. e., tube 108, constitutes a power amplifier stage. Its grids are connected across the load resistors 156 and its plates are connected to each other and to the plate voltage supply conductor 80. Its cathodes are connected, as earlier described, by the conductors 26 across the terminals of the galvanometer coil 24.

Returning now to the patient electrode selector switch 19 and to Fig. 1, it will be noted that it is shown in position STD. It will be noted further that the individual movable contacts 90 have been indicated by the reference characters 90–1, 2, 3, 4, 5. Of these, contact 90–1 is a ground contact, it being connected to ground through conductor 166. Contacts 90–2 and 90–3 are connected to the input terminals 110 and 112 through conductors 168 and 170, the former of which has inserted in series therewith a calibrating resistor 172 across which a standard calibrating cell 174 can be connected through resistors 176 and the normally open manually operable switch 178, which may be of the push button type. The contacts 90–4 and 90–5 are connected to contact 90–2 by the previously referred to conductor 92.

In the first, i. e., STD, position the amplifier input terminals are connected across resistor 172 so that the apparatus can be calibrated by closure of switch 178. When switch 178 is closed, a standardizing voltage is produced across the resistor 172 in order to enable the gain of the amplifier to be adjusted through the gain control 134 heretofore described.

Figure 8:
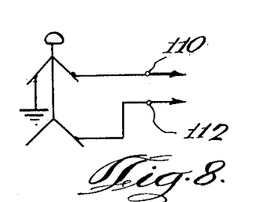

In positions 1, 2, and 3 of the selector switch, individual electrodes are connected to the input terminals of the amplifier in the manner illustrated in Fig. 8 for position 3 wherein the left arm and left leg are connected to the amplifier. From this it will be noted that the resistors connected to the selector switch 19 are not in circuit and, furthermore, that there is no interconnection between any two or more electrodes.

In positions aVR, aVL and aVF of the selector switch, pairs of electrodes are connected together for connection to one of the amplifier input terminals while a third electrode is connected to the other amplifier terminal. It was found that when this type of connection was made with a fast acting amplifier including the cathode follower type of driver and the short circuiting and grounding switch, that transients occurred. As previously indicated, it is believed that these transients result from current flow in the series circuit including the patient, electrode paste, electrodes and the interconnected leads. In accordance with the present invention, the deleterious effect of these transients is substantially entirely eliminated by inserting into the circuit between the electrodes and the point of interconnection relatively high value resistances.

Figure 4:
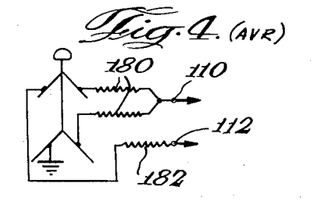
Figs. 4 to 8 are diagrammatic views illustrating five of the many possible connections of the patient electrodes to the input of the electrocardiograph amplifier.
Figure 5:
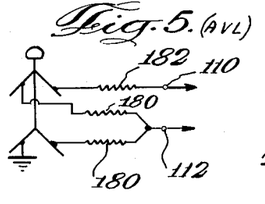
Figure 6:
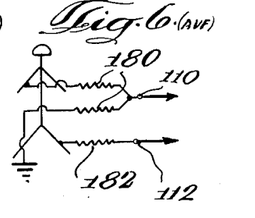

Referring now particularly to Figs. 4, 5 and 6 which illustrate the connections for the above mentioned positions, it will be noted that a resistance 180 is inserted between the electrode and the point of connection of the electrodes that are connected together for connection to an amplifier input conductor and that a resistor 182 is inserted in series with the third electrode which is connected to the other amplifier input terminal. These resistors have relatively high values. The value of resistors 180 is in the range of about 100,000 ohms. In order to obtain a balance between these interconnected resistors and the resistance in the other lead, the resistor 182 in this other lead is made to have a value of about 50,000 or 51,000 ohms, whichever is most readily available. Referring to Fig. 3, for example, it will be seen that the resistors 180 are in series with each other, the patient electrodes, the patient's body and the salty paste solution placed between the electrodes and the patient's body. As a result, the resistors reduce the current flow in this circuit thereby minimizing the effect of any transients resulting from different skin potentials at the electrodes.

The current flow that does occur does not stabilize right away because of a capacity effect in the circuit between the electrodes and body. Referring again to Fig. 3, it illustrates an analogous circuit of the body and electrodes. As shown, this circuit includes the body resistance BR, the condensers 183C and resistors 183R. As a result, there is in effect a varying signal voltage applied to the amplifier, which voltage acts over a period of time. The use of high resistances 180 in the circuit to reduce this current flow reduces the transient signal to a point where it has no appreciable effect.

Figure 7:
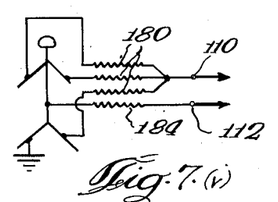

Transients are also likely to occur in the connections established at position V of the selector switch. The connections established in this position are illustrated in Fig. 7 from which it will be noted that three electrodes are interconnected and that each lead has inserted in it one of the resistors 180. A balancing resistor 184 having a value of about 33,000 ohms is inserted in series with the other lead, this being the chest lead D. Here again, the resistors 180 reduce the current flow between the leads, and thus the transient, which might otherwise be of considerable value.

Positions CF, CR and CL are those connecting the chest electrode and one of the other electrodes to the amplifier input. There is no interconnection of paired electrodes and therefore no resistors are inserted in circuit with them.

It has been found desirable and advantageous to operate the short circuiting and grounding means for the coupling condensers conjointly with the operation of the patient lead selector switch. Returning now to this part of the apparatus, it will be recalled that the short circuiting and grounding is effected through conductors, 140, 142 and 144. These conductors lead to the relay operated switch 20 which includes a relay 190 and the normally open switches 192 and 194. The switches are so arranged that switch 192 closes before switch 194 so that condensers 132 are first short circuited and then connected to ground. The closure of the short circuiting switch 192 completes a loop circuit around the plate resistors enabling the condenser charges to change rapidly in response to out of phase signal variations. The closure of switch 194 to connect the circuit to ground provides a circuit enabling the charges in the coupling condensers to change rapidly in response to the inphase variations. The circuit arrangement with the cathode follower connection of the coupling condensers to tube 102 provides a low impedance circuit enabling the coupling condensers to assume their proper charges rapidly so that the short circuit may be effective only for a very brief period of time. The short circuiting of the resistors also results in short circuiting of the input to amplifier tube 104 so that no transients are applied to it as a result of the switching operations. As a result, the present invention enables the switching time to be reduced to about one-fifth second or somewhat less.

In accordance with another feature of the present invention, the short circuiting and grounding relay 20 is momentarily energized whenever the switch is operated thereby to avoid delays in operation of the equipment. Each time that the selector switch is operated, the relay is energized briefly and maintained energized by an RC circuit for a further brief interval. In apparatus constructed in accordance with the present invention, it has been found that the selector switch can be operated as fast as humanly possible without the introduction of undesired transients whereby it is possible to make complete electrocardiograms in a very short period of time without skipping even one heart beat.

The relay 20 is operated each time the selector switch is moved. As indicated, it is momentarily energized upon each movement of the relay switch, this energization being effected by the switch 196 disclosed diagrammatically in Fig. 1 and illustrated further in Fig. 9. When the switch is closed the winding of relay 190 is connected across the voltage supply, the connection being from conductor 80, the switch 196, conductor 198, resistor 200 and conductor 202 leading to the negative supply conductor 30. At the same time, the condenser 204 is charged, it being connected to conductor 198 through resistor 206.

As indicated, the closure of the switch 196 is momentary. Once energized, the relay is maintained energized by the charge stored in condenser 204 which discharges through a resistor 206 and the resistor 200. The resistor 206 is utilized to reduce the initial capacitor charging current. The arrangement of the switch and of the circuit maintaining the relay energized is such that the switch is closed for what is practically a negligible period of time each time the selector switch is operated and the time delay provided by the capacitor is somewhat less than one-fifth of one second. The arrangement is, furthermore, such that the total time during which the relay is operated and therefore the coupling condensers are shorted and grounded is about one-fifth of a second, which is slightly longer than the duration of any transients which occur upon operations of the lead selector switch except those occurring in position V when the chest electrode is moved from place to place. It has been found that in this position, movement of the chest electrode causes unusually large transients and in order to avoid the effect of these, there is provided another and manually operable short circuiting and grounding means in parallel with the relay operated switch, which will be described shortly, whereby the deleterious effect of these transients is avoided by manual increase in shorting time. These transients, as noted, occur only when the chest electrode is moved and not when it is in place, say when the initial V reading is made or in going from the final reading to CF. If desired, these transients can be avoided entirely by using a number of chest electrodes and switching them as by an auxiliary switch in circuit with the lead selector switch.

Figure 10:
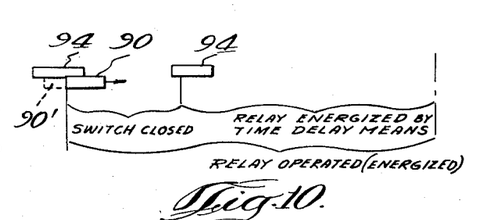
Fig. 10 is a diagrammatic showing of the control switch and associated relay operation.

Referring now more particularly to Figs. 9 and 10 and first to Fig. 9, the automatically operated switch 196 has been schematically illustrated as a microswitch. It is operated by a plunger 210 actuated by a detent wheel 212 mounted on the shaft 88 of the selector switch. The operative connection between the detent wheel and plunger 210 includes a detent ball 214 located in an annular guide 216 and held in place by a resilient bracket 218 between which and plunger 210 there is located a resilient arm 220. The arrangement is such that the ball is moved to close the switch 196 by one of the detent teeth as the selector switch is moved from one position to another. The ball also serves to position the selector switch. For further details of this switch construction, reference should be had to the contemporaneously filed application of Arthur W. Anderson, application Serial No. 445,417, now Patent 2,841,663.

Referring now to Fig. 10, there is here illustrated diagrammatically a movable contact member 90 and a pair of adjacent stationary contact members 94 of the lead selector switch. The movable contact 90 is shown in an intermediate position in its movement from one stationary contact to another. The figure also illustrates the time of closure of the switch 196, the time that the relay 20 remains energized after the switch 196 opens, and the total time that the relay remains operated. The time of closure of switch 196 is very small and has been exaggerated in Fig. 10 but it will be observed that the switch remains closed during the time that the movable contact 90 is moved from one contact 94 to another. In other words, the switch 196 is closed before contact 90 moves away from one contact 94 and until after the movable contact reaches the next stationary contact. The arrangement thus insures short circuiting of the coupling condensers for the entire period between establishment of connections between adjacent selector switch positions and for a very brief interval thereafter by discharge of condenser 204 through the relay winding.

In order to enable the amplifier 104 to be short circuited when desired and particularly when the chest electrode is moved from place to place in position V, there is provided a manually operable switch indicated by the reference character 220. It is effectively in parallel with the switch 192, 194 and when operated it grounds and short circuits the coupling condensers 132 in the same manner as the switch 192, 194 operated by the relay 20.

From the foregoing detailed description of the present invention, it will be apparent that it provides a fast acting electrocardiograph enabling successive sets of patient electrodes to be connected to the amplifying apparatus for the making of a complete cardiogram without necessitating or requiring any delay in making of the record and also enabling the cardiogram to include every heart beat of the patient.

In use, the electrodes are connected to the patient in the usual manner. The selector switch 19 is operated into its STD position. The main power switch 60 is closed with the result that the rectifier becomes operative. After a time delay necessary to enable the equipment to reach a steady state operating condition, switch 46 is closed to supply current to the stylus of the galvanometer and to operate the record medium driving motor 50. Calibration is then effected by pulsing switch 178 to apply the standardizing potential across the resistor 172, which is connected to the amplifier input and adjustment of the gain control 134. Centering of the stylus is effected by movement of the control element 150.

Assuming that it is desired to go through positions 1 through CL, in rapid sequence, the selector switch is operated first to position 1. In so doing, the coupling condensers 132 are short circuited and grounded momentarily as described in detail to eliminate transients. A record is then made of the heart potentials as measured between the left arm and right arm of the patient.

When this record has been made, and it may include several or more heart beats, the selector switch is operated with the result that the coupling condensers are again short circuited and grounded by the relay operated switch. In the next position, the right arm and left leg are connected to the input of the amplifier.

This operation is repeated for the next position.

When the switch-over is made to the aVR position, the left arm and left leg are interconnected and connected to one amplifier input terminal. The right arm is connected to the other. At this time, the resistors 180 are connected in series as illustrated in Fig. 4 and resistor 182 is connected to input terminal 112. As heretofore described, the resistors 180 decrease the current flow in the series circuit including then the electrodes and the patient whereby the resulting voltage variation is minimized to such a value that it has no effect appreciably upon the recording. Thus the capacity effect which would cause the transient to take place over a period of time is effectively eliminated.

The above described operations also take place in the aVL and aVF positions illustrated in Figs. 5 and 6. In the V position, illustrated in Fig. 7, a similar operation occurs, while in the remaining positions, the operaton is similar to the first three.

In the event that the chest electrode is moved from place to place in the V position, the amplifier switch 220 can be operated manually if the transients are of longer duration than the others.

Figure 11:
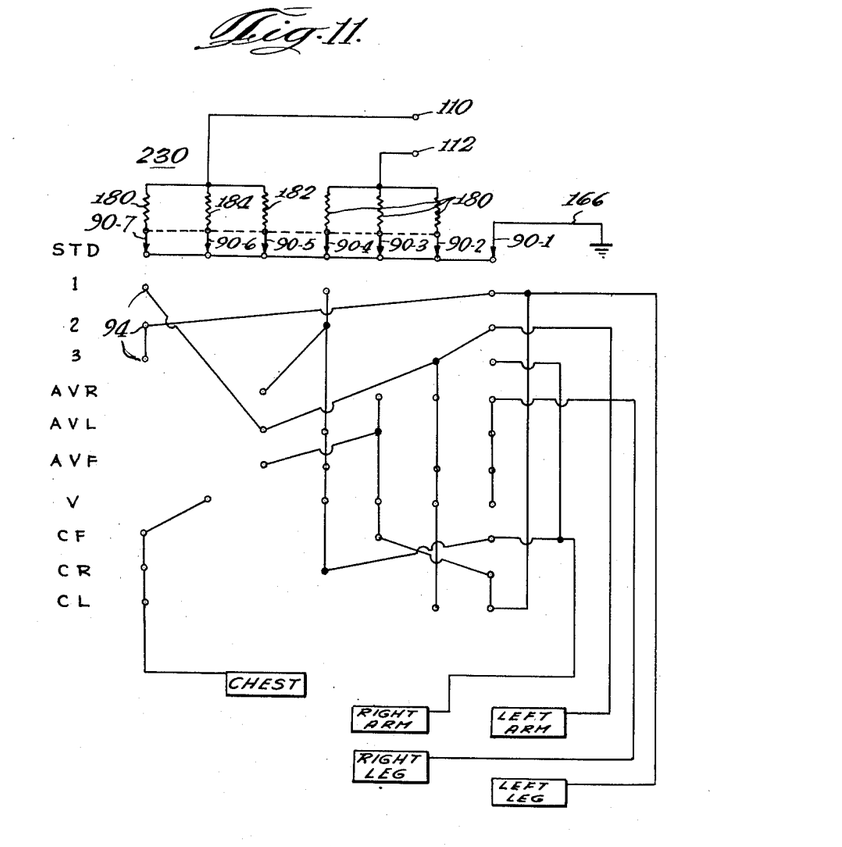
Fig. 11 is a diagrammatic showing of a modified form of patient lead selector switch.

A modified form of lead selector switch enabling the current reducing resistors to be isolated from the switch is illustrated in Fig. 11. It is indicated as a whole by reference character 230 and, as indicated, it is operable through the same positions as the previously described switch 19. It includes a number of stationary contacts 94 arranged this time in seven instead of five wafers. It includes also movable contacts 90–1, 2, 3, 4, 5, and 6. The switch of this modification is constructed and arranged so that the resistors can be physically isolated from the switch and placed into a shielded container if desired. It also has the advantage wiring can be done in an easier manner because the resistors are not supported on the wafer assembly but can be physically isolated from the switch whereby they can be connected in the respective circuits in easier manner. The elimination of the resistors from the switch wafers also enables the switch to be made more compact.

Figure 12:
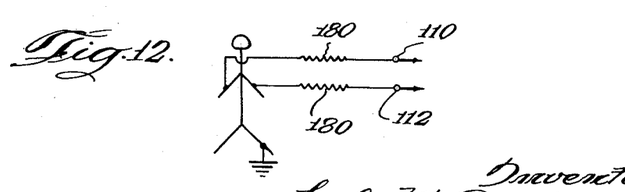
Fig. 12 is a diagrammatic representation of a type of patient lead connection effected with the selector switch of Fig. 11.

In the switch arrangement of Fig. 11, the 100,000 ohm resistors 180 are placed in series with the patient leads in positions 1, 2, 3, CF, CR and CL. This insertion of the resistors is illustrated in Fig. 12 for position 3. This, however, makes no change in the operation of the apparatus because the voltage variations are transmitted to the amplifier input without any substantial attenuation. In the remaining positions, the connections are the same as indicated and described heretofore, namely as illustrated in Figs. 4 to 7. In other words, the resistors are inserted in the patient lead circuits to reduce the circulating current flow and the resulting transients to an inconsequential value.

Figures 13, 14, 15, 16:
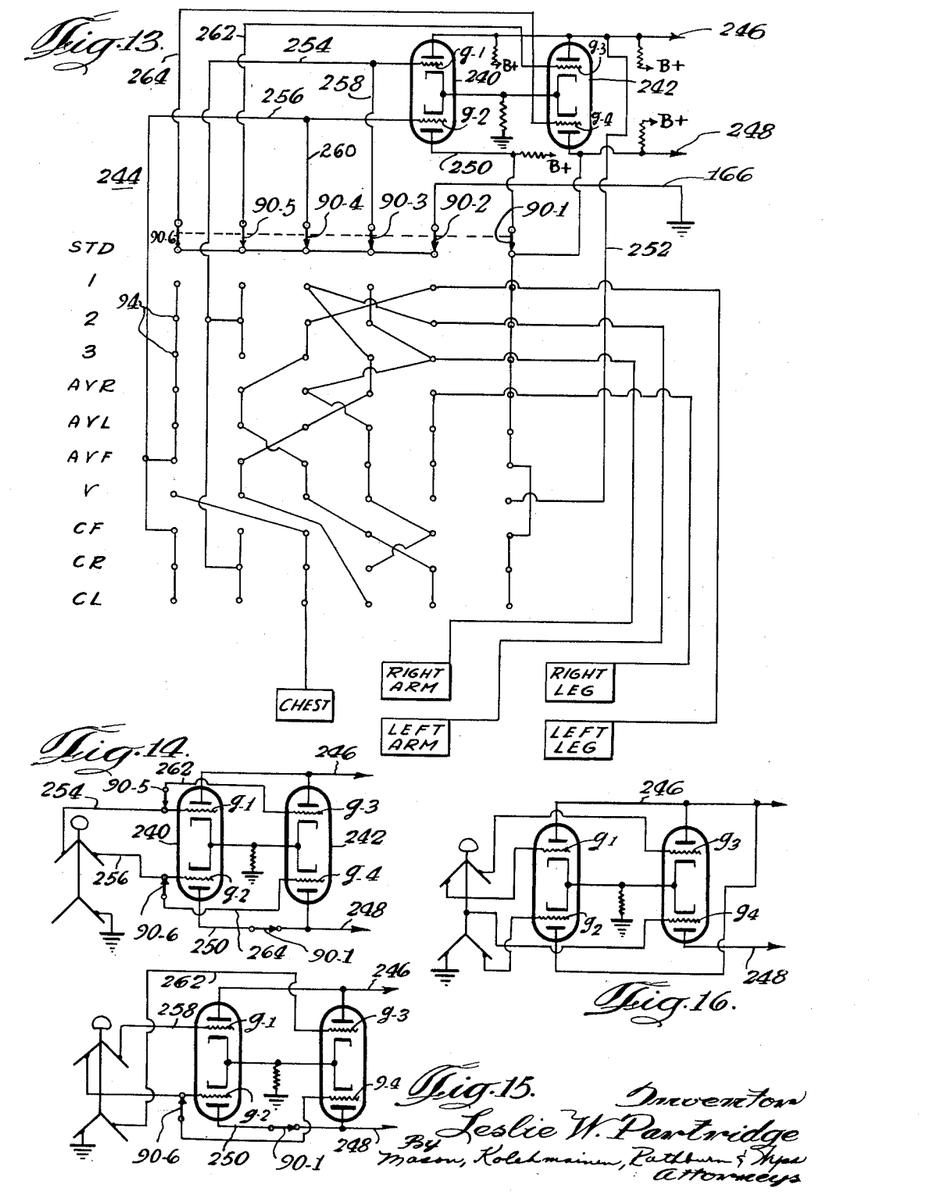
Fig. 13 is a diagrammatic representation of a portion of another embodiment of the present invention.
Figs. 14, 15 and 16 are diagrammatic views illustrating certain of the connections of the patient electrodes effected with the embodiment of Fig. 13.

A further embodiment of the switching means and also a circuit arrangement for eliminating the effects of circulating current when two or more patient leads are interconnected for connection to the amplifier input is shown in Fig. 13. In this embodiment, a pair of vacuum tubes 240 and 242 are used. They are both of the double triode type and their input electrodes are adapted selectively to be connected to ground and to the patient electrodes through the lead selector switch indicated as a whole by reference character 244 and including a plurality of stationary contacts 94 and a plurality of movable contacts 90–1, 2, 3, 4, 5 and 6, respectively, which are connected for simultaneous movement and which also control certain of the plate circuits of the tubes.

A complete electrocardiograph has not been shown but the apparatus illustrated in Fig. 13 may be connected to the input electrodes of the coupling condenser driver tube 102 by the conductors 246 and 248, this tube thus constituting what might be considered translating means with input terminals. The plates of tubes 240 and 242, upper sections, are connected to the conductor 246. The plate of lower section of tube 242 is connected to the conductor 248 and the plate of lower section of tube 240 is connected by conductor 250 to the movable switch contact 90–1. Plate conductor 246 is also connected by conductor 252 to one of the stationary contacts 194. The plates are connected to B+ through associated plate resistors, as shown. The grids of tube 240, indicated by the reference characters G–1 and G–2, are connected by conductors 254 and 256 to certain of the stationary switch contacts 94 and the conductors 258 and 260 to movable switch contacts 90–3 and 90–4, respectively. The grids G–3 and G–4 of tube 242 are connected by conductors 262 and 264, movable switch contacts 90–5 and 90–6. Switch contact 90–2 is connected by conductor 166 to ground. The various electrodes are connected by indicated conductors to various of the stationary switch contacts.

The selector switch 244 is arranged to produce three different types of connections. One type is for positions 1, 2, 3, CF, CR and CL. This type of connection is illustrated in Fig. 14 for position 1. From this, it will be noted that the tubes 240 and 242 are effectively connected in parallel, grids G–1 and G–3 being connected to the left arm while the left leg is grounded. This same type of parallel connection is effected for the other named positions.

Another type of connection is illustrated in Fig. 15 which illustrates the connections for the aVR position.

It may be recalled that the aVR position is one in which the left arm and left leg are interconnected for connection to one amplifier input terminal and in which the right arm is connected to the other amplifier input terminal. In the present arrangement this interconnection is effected by connecting the left leg to grid G-3 through the conductor 262 and the left arm to grid G-1 through conductor 258 and switch blade 90-3. The right arm is connected to grids G-2 and G-4 and the tubes associated with these interconnected grids are effectively connected in parallel. The same type of connection is made in positions aVL and aVF with, however, different leads interconnected.

A third type of connection is provided in position V. This is the position illustrated in Fig. 7 and which requires the interconnection of three patient electrodes, these being the right arm, left arm and left leg, while the chest electrode is connected to a different input of the amplifier. In this arrangement, shown in Fig. 16, grids G-1, G-2 and G-3 are connected to the arm and leg electrodes and the plates of the associated tube sections are all connected, this time to conductor 246. The chest electrode is connected to grid G-4. There is, thus, provided an arrangement in which the three tube sections provide a vectorial addition of the voltages from the three interconnected electrodes.

The further embodiment of the invention illustrated in Fig. 17 is similar to that of Fig. 13 in that the electrodes are connected to the grids of tubes. The tubes, however, are of the cathode follower type whereby the lead switching can be effected somewhat more simply. As shown in the figure, the arrangement includes two tubes 270 and 272 of the double triode type which are connected to a regulated source of B voltage through the individual cathode resistors 274, 276, 278 and 280. The grids are connected to the right and left arm, left leg and chest electrodes. The cathode junctions of the resistors and right leg electrode are connected by conductors 274-1, 276-1, 278-1 and 280-1 to a lead selector switch 282, which may be similar to selector switch 19. The switch 282 is adapted to make the desired connections of the electrodes to the conductors 284 and 286 constituting an input to a preamplifier section 288, the output of which is coupled by conductors 290 and 292 to a condenser charging section including tube 102 such as the one shown in Fig. 1.

In the series of connections 1, 2 and 3, the individual tube sections connected to individual electrodes are connected by the patient selector switch 282 to the input conductors 284 and 286. In the augmented series of connections, pairs of electrodes are connected to one of conductors 284 or 286, this being done by connecting together various of the conductors 274-1, 276-1 and 280-1. In the V connection, the last named conductors are joined and connected to conductor 286, while conductor 278-1 is connected to conductor 284. As with the previously described arrangements there are no consequential transients created by current flow as a result of pairing of the electrodes.

From the foregoing detailed description of the present invention, it may be noted that in this last embodiment the deleterious effects of circulating current through the patient leads and electrodes is effectively eliminated by reason of the fact that no circulating current can occur because of the isolating action of the vacuum tubes. The tubes act both as amplifying means and high resistance means effectively in series with the electrodes to prevent circulating currents.

While the present invention has been illustrated in connection with several embodiments thereof, it should be understood that these details are not intended to be limitative of the invention except insofar as set forth in the accompanying claims.

Having thus described my invention, what I desire to secure by United States Letters Patent is as follows:

1. An electrocardiograph for use with electrodes adapted to be connected as by patient leads to various points on a patient's body, including in combination, amplifying means having input terminals, means including a multi-position lead selector switch for connecting various of said electrodes to the input terminals of said amplifying means, said last mentioned means being constructed and arranged in at least one position to interconnect certain of said electrodes for connection to one of said terminals and to connect another one of said electrodes to the other of said terminals, and resistance means of about one-hundred thousand ohms adapted to be inserted in series circuit with each of said electrodes and the aforesaid point of interconnection by said switch means in said one position to decrease the current flow in the series circuit including the electrodes, resistance means and patient's body to a low value, and resistance means of about fifty thousand ohms adapted to be inserted in circuit between said another one of the electrodes and the other of said terminals by said switch means in said one position.

2. An electrocardiograph as claimed in claim 1 wherein said switch means includes fixed contacts adapted to be connected to patient leads and electrodes, and movable contacts and said resistance means are connected between said movable contacts and said amplifying means.

3. An electrocardiograph for use with electrodes adapted to be connected as by patient leads to various points on a patient's body, including in combination, amplifying means having input terminals, means including a multi-position lead selector switch for connecting various of said electrodes to the input terminals of said amplifying means, said last mentioned means being constructed and arranged in at least one position to connect the junction of three said electrodes for connection to one of said terminals and to connect another one of said electrodes to the other of said terminals, and resistance means of about one-hundred thousand ohms adapted to be inserted in circuit between each of said three electrodes and the junction by said switch means in said one position, and resistance means of about thirty-three thousand ohms adapted to be inserted in circuit between said another one of the electrodes and the other of said terminals by said switch means in said one position.

4. An electrocardiograph as claimed in claim 3 wherein said means including a multi-position lead selector switch is constructed and arranged in another position to connect the junction to two electrodes to one of said terminals and another one of said electrodes to the other of said terminals, and including also resistance means of about one hundred thousand ohms adapted to be inserted in circuit between each of said electrodes and the junction in said another position, and resistance means of about fifty thousand ohms adapted to be inserted in circuit between another one of said electrodes and the other of said terminals in said another position.

5. An electrocardiograph for use with electrodes adapted to be connected as by patient leads to various points on a patient's body, including in combination, translating means having input terminals, means including a multi-position selector switch for connecting various of said electrodes to said input terminals, said means being constructed and arranged in at least one position to pair certain of said electrodes for connection to one of said terminals, and vacuum tubes having grids to which individual electrodes are connected constituting resistance means of high value for effectively preventing any consequential current flow in a series circuit between the paired electrodes.

6. An electrocardiograph as claimed in claim 5 wherein said vacuum tubes have plates coupled to said input terminals and said grids are adapted to be connected to individual electrodes by said selector switch.

7. An electrocardiograph as claimed in claim 5 wherein said vacuum tubes are connected in cathode follower configuration and have cathodes adapted to be coupled to said input terminals through said selector switch.

8. An electrocardiograph for use with patient electrodes to be connected as by patient leads to various points on a patient's body, including in combination, translating means having input terminals, means including a muli-position selector switch, electron tube means and circuits controlled by the switch means for connecting various of said patient electrodes to said input terminals, said electron tube means including four individual control electrodes and associated cathodes and plates, and said switch means being operable in one series of positions to connect pairs of individual patient electrodes to pairs of control electrodes and to connect the pairs of plates associated with said pairs of control electrodes to said input terminals, in a second series of positions to connect one pair of individual patient electrodes to one pair of control electrodes and the plates associated with the latter to one input terminal and another patient electrode to another pair of control electrodes and the plates associated with the latter to another input terminal, and in a further position to connect three individual patient electrodes to three individual control electrodes and the plates associated with the latter to one of the input terminals and another patient electrode to a fourth control electrode, the associated plate of which is connected to the other input terminal.

9. In an electrocardiograph, the combination including, a preamplifier stage, a condenser charging stage of the push pull cathode follower type coupled to the preamplifier stage, a first direct current amplifier stage of the push pull type, means including a pair of coupling condensers connected to said cathode follower stage for coupling said charging stage to said amplifier stage, selector switch means for changing the input connections to said preamplifier stage, and switch means operable in response to operation of said selector switch means for sequentially short circuiting and grounding said condensers for a brief interval of time.

10. In an electrocardiograph, the combination including, a preamplifier stage, a stage of the push pull cathode follower type coupled to the preamplifier stage, a first direct current amplifier stage of the push pull type, means including a pair of coupling condensers connected to said cathode follower stage for coupling it to said amplifier stage, selector switch means for changing the input connections to said preamplifier stage, and switch means operable in response to operation of said selector switch means for sequentially short circuiting and grounding said condensers.

11. In an electrocardiograph as claimed in claim 10 wherein said selector means includes a plurality of fixed contacts and movable contacts movable between adjacent fixed contacts and wherein said switch means operable by said selector means includes a switch which is closed during the time the movable contact moves from one fixed contact to the next one.

12. In an electrocardiograph, the combination including, a preamplifier stage, a condenser charging stage of the push pull cathode follower type coupled to the preamplifier stage, a first direct current amplifier stage of the push pull type, means including a pair of coupling condensers connected to said cathode follower stage for coupling said charging stage to said amplifier stage, selector switch means for changing the input connections to said preamplifier stage, and switch means operable in response to operation of said selector switch means for grounding said condensers for a brief interval of time.

13. In an electrocardiograph, the combination including, a preamplifier stage, a stage of the push pull cathode follower type coupled to the preamplifier stage, a first direct current amplifier stage of the push pull type, means including a pair of coupling condensers connected to said cathode follower stage for coupling it to said amplifier stage, selector switch means for changing the input connections to said preamplifier stage, and switch means operable in response to operation of said selector switch means and including a single switch for connecting a short circuit across both of said condensers.

14. In an electrocardiograph, the combination including, a preamplifier stage, a condenser charging stage of the push pull cathode follower type employing triodes and coupled to the preamplifier stage, said charging stage including a pair of connected cathode resistors having their junction connected to B—, a first direct current amplifier stage of the push pull type including a pair of connected input resistors having their junction connected to B—, means including a pair of coupling condensers connected across the cathode ends of said cathode resistors and the unconnected ends of said input resistors for coupling said charging stage to said amplifier stage, selector switch means for changing the input connections to said preamplifier stage, and a first switch operable in response to operation of said selector switch means for completing a short circuit across both said condensers and second switch means for connecting the connected condensers to B— for a brief interval of time.

15. In an electrocardiograph, the combination including, amplifying means having an amplifying stage having an input, normally open switch means operable to short circuit the input, selector means for changing connections to said amplifying means, and means operable simultaneously with said selector means for operating said switch means briefly to short circuit said input, said last mentioned means including a normally deenergized relay operable to close said switch means, a condenser connected to said relay and switch means operated by said selector means briefly to connect said relay and condenser to a power source to operate the relay and to charge said condenser, and time delay means associated with said condenser for maintaining said relay energized for a brief period after said switch is opened to disconnect the relay and condenser from the power source.

16. In an electrocardiograph, low impedance driving means including a first pair of push-pull connected electronic devices having an input, a second pair of push-pull connected electronic devices having an input, means including a pair of coupling condensers for supplying signals from the first pair of electronic devices to the input of said second pair of electronic devices, means including a selector switch operable to successive settings for supplying signals to the input of said first pair of electronic devices, and means controlled by operation of said selector switch for short circuiting said pair of coupling condensers and for connecting said pair of coupling condensers to a reference potential.

17. An electrocardiograph for use with a plurality of patient electrodes, a first amplifying stage having an input and an output and constituting low impedance driving means, a second amplifying stage having an input, capacitive means connected to the output of said first stage and to the input to said second stage for coupling signals from said first stage to said second stage, means including a selector switch for successively extending connections to different ones of said patient electrodes for supplying signals to the input of said first stage, and means connected to said capacitive means and operated in response to operation of said selector switch for preventing the application of undesired transient voltages by said capacitive means to the input of said second stage resulting from the operation of said selector switch.

18. In an electrocardiograph, the combination including, a coupling condenser charging stage having low impedance and of the push-pull type, a direct current amplifier stage of the push-pull type, means including a pair of coupling condensers connected to said charging stage for coupling it to said amplifier stage, means including selector switch means for changing input connections to the electrocardiograph, and switch means operable in response to operation of said selector switch means for connecting said condensers to a source of reference potential for a brief interval of time.

19. In an electrocardiograph as claimed in claim 18 wherein said electrocardiograph has input connections including means constituting resistance means of high value for preventing any consequential current flow in a series circuit between paired patient's electrodes.

20. An electrocardiograph for use with patient electrodes comprising first push-pull connected amplifier means of low impedance and having a pair of input terminals and an output means, second push-pull connected amplifier means having input means, a pair of capacitive means coupling said output means to said input means, indicating means connected to and controlled by said second amplifier means, a resistance network connected to said patient electrodes and including a plurality of resistance elements of large value for greatly attenuating the flow of current between connected ones of said electrodes, a selector switch having output terminals connected to said pair of input terminals and having a plurality of input contacts adapted to be connected to said patient electrodes and to said resistance network, said selector switch being operable to a first group of settings in which different ones of said patient electrodes are directly connected to said output terminals by said input contacts and being operable to a second group of settings in which different ones of said patient electrodes are connected to each other in series through different pairs of said resistance elements and to one of said output terminals by said input contacts and in which different individual patient electrodes are connected to the other of said output terminals through one of said resistance elements by said input contacts, the signal transmitting path between said patient electrodes and said indicating means being entirely direct current coupled except for said pair of capacitive means between said first and second amplifier means, and switch means controlled by operation of said selector switch and connected to said capacitive means for connecting said pair of capacitive means together and to a reference potential at least in response to each operation of said selector switch to a setting in said second group of settings.

21. The electrocardiograph set forth in claim 20 in which said patient electrodes include a left leg electrode, a left arm electrode, a right arm electrode, and a chest electrode; and in which said resistance network includes a resistance element of about one hundred thousand ohms and a resistance element of about fifty thousand ohms connected to each of said left leg, left arm, and right arm electrodes, and a resistance element of about thirty-three thousand ohms connected to said chest electrode.

22. An electrocardiograph for use with a plurality of separate patient electrodes comprising a plurality of cascade connected stages of push-pull amplifier means, the first stage of said push-pull amplifier means having a pair of input terminals and the last stage thereof having a pair of output terminals; circuit means for capacitively coupling only one pair of said stages other than said first stage and direct current coupling all of the remaining stages in said cascade connection; said one pair including a low impedance condenser driving stage; indicating means connected to said pair of output terminals; a resistance network connected to said patient electrodes and including a plurality of resistance elements of large current limiting values; a selector switch connected to said input terminals and operable to directly couple said input terminals to said patient electrodes, said selector switch being operable to a plurality of settings in which at least two of said electrodes are connected in series with each other through said resistance elements and to one of said input terminals, the connection of said electrodes in series through said resistance elements arresting the development of transient signals; and means controlled by operation of said selector switch for controlling the circuit means capacitively coupling said pair of push-pull amplifier stages to arrest the development of transient signals, thereby to prevent the application of transient signals to said indicating means arising out of operation of said selector switch due to interconnecting patient electrodes and to the capacitive coupling between said pair of amplifier stages.

23. In an electrocardiograph using at least four patient electrodes, four electronic devices each having a control electrode and an output electrode, impedance means connected in series with each of said output electrodes, means connecting each of said patient electrodes to one of said control electrodes, a selector switch having at least four input terminals and at least two output terminals, means connecting each one of said input terminals to one of said impedance means, and a push-pull amplifying means having a pair of amplifier input terminals connected to said two output terminals, said selector switch being operable to different settings in which different ones of said impedance means are connected together and to one of said amplifier input terminals and in which different single ones at said impedance means are connected to the other of said amplifier input terminals.

References Cited in the file of this patent

UNITED STATES PATENTS

| | | |
|---|---|---|
| 2,638,401 | Lukacs | May 12, 1953 |
| 2,647,508 | Pelavin | Aug. 4, 1953 |
| 2,687,935 | Cannon | Aug. 31, 1954 |